June 24, 1930.  F. C. FANTZ  1,767,658
FLOW CONTROL VALVE
Filed March 7, 1927
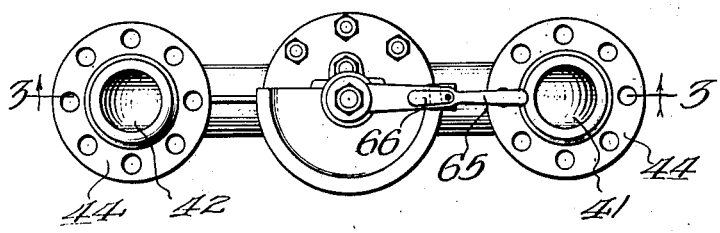
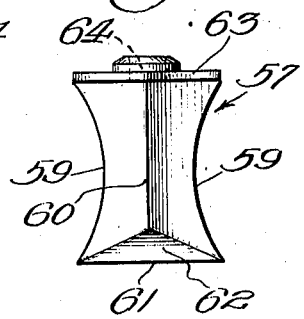
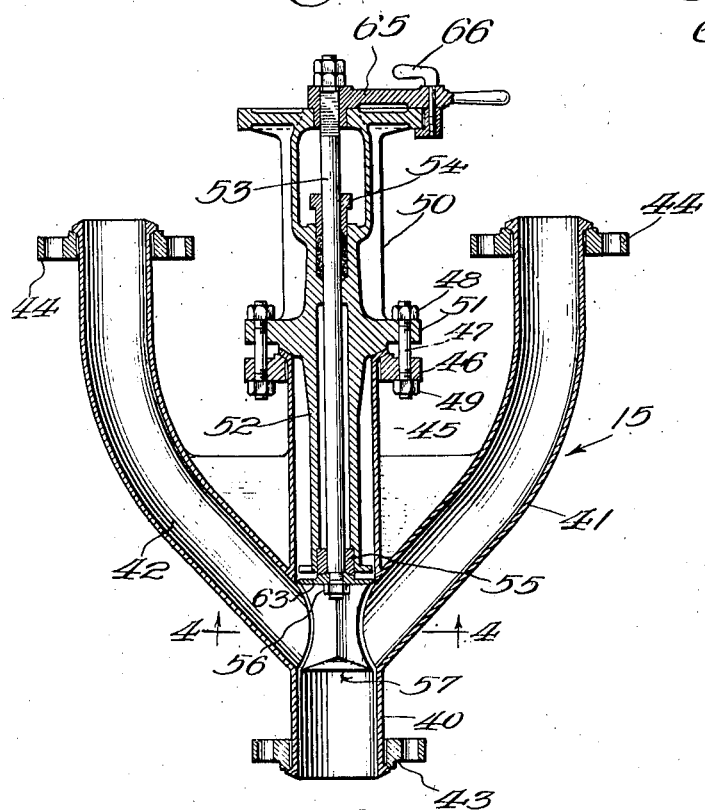
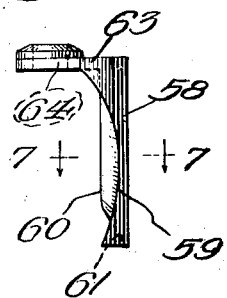
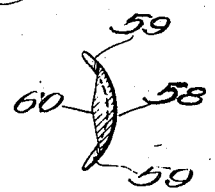
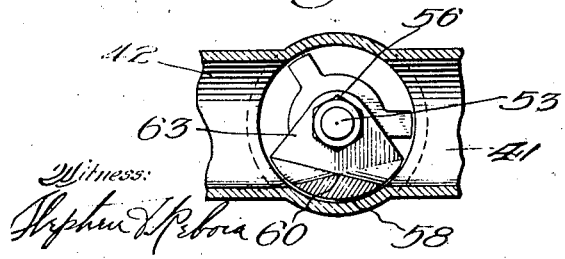
Inventor:
Fred C. Fantz
By Frank L. Belknap
Atty.

Patented June 24, 1930

1,767,658

UNITED STATES PATENT OFFICE

FRED C. FANTZ, OF WEBSTER GROVES, MISSOURI, ASSIGNOR TO UNIVERSAL OIL PRODUCTS COMPANY, OF CHICAGO, ILLINOIS, A CORPORATION OF SOUTH DAKOTA

FLOW-CONTROL VALVE

Application filed March 7, 1927. Serial No. 173,430.

The present improvements relate more particularly to a flow control valve for use between chambers connected in parallel, which chambers comprise part of a tube and drum type of apparatus for cracking hydrocarbon oil. In its broader aspects, the flow control valve of the present invention is adapted for use in the exit from a main conduit into a plurality of branches.

The invention has for its principal object to provide a valve by which the flow of liquid from a main conduit may be diverted into one or more selected branches, and has for another object a scientifically designed valve by which the amount of liquid concurrently flowing through two or more brachnes may be varied in the different branches.

The device is characterized by its extreme simplicity, economy in manufacture, ease of installation and removal, and high efficiency in use.

The utility as well as other objects and advantages of the invention will be more particularly hereinafter brought out.

In the drawings:

Fig. 1 is a top plan view of a Y fitting provided with the valve of the present invention.

Fig. 2 is a cross sectional view through line 3—3 of Fig. 1.

Fig. 3 is a cross sectional view taken through line 4—4 of Fig. 2, and looking in the direction of the arrows.

Figs. 4 and 5 respectively, are face and side views of the valve per se.

Fig. 6 is a cross sectional view on the line 7—7 of Fig. 5.

The valve of the present invention is illustrated as being applied in a transfer line for delivering heated oil into chambers arranged in parallel. It is to be understood at the outset that the broad concept of the invention contemplates that the valve can be installed in any main conduit from which branches project.

In the valve which comprises the subject matter of the present invention and generally indicated at 15, the main line communicates with the base 40 of the Y fitting, which in the present instance is provided with the branches 41 and 42. It is to be understood that any number of branches may project from the main base 40, and it may take any shape other than a Y fitting, if desired. A flange 43 may be provided for the purpose of connecting the main line to base 40. The upper ends of the branches 41 and 42 may be similarly provided with flanges 44 for the purpose of being connected to the branch lines to be connected with conduit 40. Projecting upwardly between the branches 41 and 42, and above the conduit 40, is a similar conduit 45 provided with a flange adapted to form a bearing surface against which the flange on the annular lug 46 may bear, being secured in place by means of the bolt 47 and lock nuts 48 and 49. A hollow casting 50 may be provided above the conduit 45, the flange 51 of which provides the means for making the necessary connection with the conduit 45. This supporting structure 50 is provided with the downwardly projecting hollow guide 52, in which is mounted the rotatable valve stem 53. A suitable packing gland illustrated diagrammatically at 54, may be provided intermediate the stem. Adjacent its lower end it may be provided with the annular lug 55 adapted to rotate in a confined space cut out of the inner wall of the projection 52 as illustrated in Fig. 2.

Detachably connected by means, for instance, of the lock nut 56 to the lower end of the valve stem 53, is a valve member designated as a whole 57, which preferably comprises a body portion 58 having a segmental arc shape and being relatively thin (Fig. 6). The side edges 59 of the body portion may be inwardly cut away, and are preferably curved as indicated in Fig. 4. From both side edges 59 the body portion increases in thickness, until an intermediate point is reached, illustrated at 60, where a ridge is produced. The body portion projecting upwardly from the lower edge 61 also increases in thickness as illustrated, forming in effect, a triangle illustrated at 62. The upper end of the valve may be provided with the apertured flange 63 provided with the aperture 64 through which the base of the stem 53 is adapted to be forced. The upper end of the valve stem is connected to an outwardly projecting handle 65 which may be provided with a suitable retaining pin 66 to prevent accidental displacement.

The operation of the valve should be apparent from the foregoing description. It is particularly adaptable for use where two or more chambers are provided in parallel for the purpose of diverting more or less liquid into either one of the chambers, as may be desired, in order to control the liquid level therein. By rotating the deflecting valve 58 by means of hand lever 65, the deflecting valve 58 can be moved to partly close off one or the other of the branches 41 or 42. It is understood of course, that the hand lever 65 may be replaced with any other suitable operating mechanism, so that the stem 53 can be rotated from a remote position through a rack and pinion arrangement, or the like.

The principal feature of this control valve resides in its simplicity and freedom from obstructing the flow of the oil through the various branches. It requires only a slight movement of the valve to divert the flow of oil, and when the valve is in a position so that it does restrict one of the openings, it does not form too great an obstruction so as to cause an undue amount of coke and carbon to collect in its parts. It has been scientifically designed to prevent any carbon or coke obstruction. Should coke or carbon collect in the Y fitting at the opening to the branches 41 and 42, the deflector valve can be rotated to clean the obstructions, after which it may be again placed in position to divert the proper amount of oil to each chamber.

I claim as my invention:

1. A valve adapted to be seated in the opening from a main conduit into a plurality of branches, comprising a valve stem and a deflecting valve carried thereby, the latter having a segmental arc shaped body portion, the side edges of which are curved and inwardly cut away, the body portion from both sides inwardly increasing in thickness and tapering to an intermediate meeting point, the body adjacent the lower edge also increasing in thickness and tapering inwardly to converge with said intermediate meeting point from the side edges, the top end of the body portion being provided with means adapted for engagement with the valve stem.

2. A valve adapted to be seated in the opening from a main conduit into a plurality of branches, comprising a valve stem and a deflecting valve carried thereby, the latter having a segmental arc shaped body portion, increasing in thickness inwardly from both side edges and tapering to an intermediate meeting point.

FRED C. FANTZ.